United States Patent [19]
Korger

[11] 4,190,291
[45] Feb. 26, 1980

[54] ADJUSTABLE HEADREST ASSEMBLY FOR AUTOMOTIVE VEHICLES

[75] Inventor: Heinz K. Korger, Niederstotzingen, Fed. Rep. of Germany

[73] Assignee: Carl Stahl GmbH & Co. KG, Gurt -und Bandweberei, Herbrechtingen, Fed. Rep. of Germany

[21] Appl. No.: 832,829

[22] Filed: Sep. 13, 1977

[30] Foreign Application Priority Data

Sep. 15, 1976 [DE] Fed. Rep. of Germany ....... 2641470

[51] Int. Cl.$^2$ .............................................. A47C 1/10
[52] U.S. Cl. ................................................. 297/408
[58] Field of Search ........................ 297/406, 408, 409

[56] References Cited
U.S. PATENT DOCUMENTS

| | | | |
|---|---|---|---|
| 1,576,915 | 3/1926 | Koenigkramer | 297/409 |
| 2,624,397 | 1/1953 | St. Aubin | 297/409 X |

Primary Examiner—James C. Mitchell
Attorney, Agent, or Firm—Toren, McGeady and Stanger

[57] ABSTRACT

A padded headrest for the seat back of a motor vehicle includes a stirrup-shaped mounting body pivotally mounted on a horizontal support through vertical supports which are longitudinally adjustably connected to the mounting body and which are fastened in corresponding receiving parts at the seat back. The assembly consists of a device for securing the headrest body in each adjusted inclined position at the horizontal support and is characterized in that the stirrup-shaped mounting body of the headrest body is longitudinally movably guided in at least one helically arranged peripheral recess of a horizontal support having an at least semicircular cross-sectional profile and being attached to vertical supports in a manner preventing the horizontal support from pivoting.

16 Claims, 7 Drawing Figures

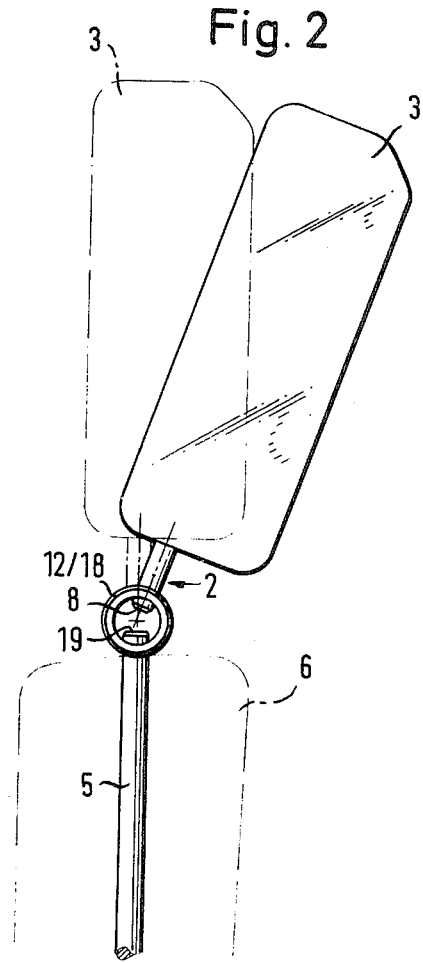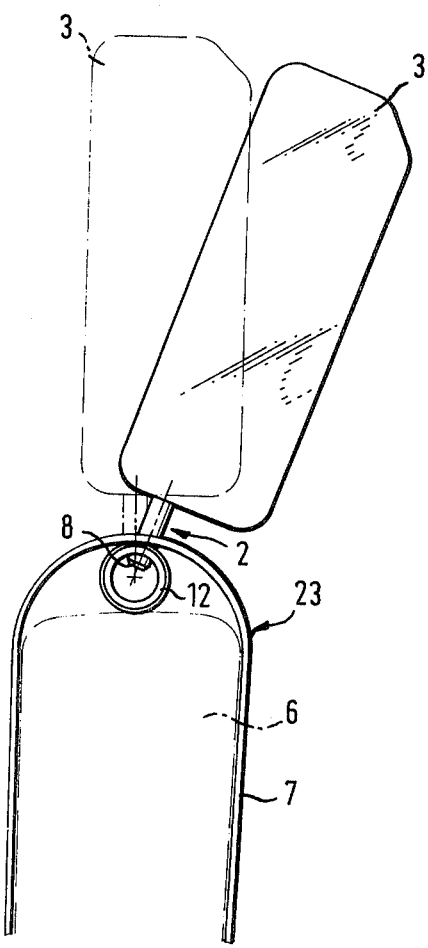

ADJUSTABLE HEADREST ASSEMBLY FOR AUTOMOTIVE VEHICLES

The invention relates to a headrest for vehicles, especially automotive vehicles, with limited adjustability. The headrest consists of a padded body with a stirrup-shaped mounting body. This mounting body is pivotably mounted on a horizontal support by means of at least one fastening member which is connected to at least one of the free ends of the arms of the mounting body. The horizontal support is mounted in corresponding receiving parts at the seat back or at clamping stirrups by means of vertical supports which are longitudinally adjustably connected to the mounting body. The headrest also consists of a device for securing the headrest at this horizontal support in each inclined position to which the headrest is adjusted.

The invention is based on the task to create a headrest of the above-mentioned design for vehicles, especially automotive vehicles, with limited adjustability. On the one hand, the headrest is to provide excellent energy absorption through a direct, firm connection between the mounting body of the headrest body and the horizontal supports assigned to the headrest while requiring the least effort possible for production and assembly. On the other hand, it must be possible, when at least the mounting body of the headrest is of uniform design, to mount the headrest on any known design of a fastening device, for example insertable supports or clamping stirrups at the seat back of any vehicle seat.

In a headrest of the above-described design, this task is solved according to the invention by longitudinally movably guiding the stirrup-shaped mounting body in one or several helically arranged peripheral recesses of a horizontal support which has at least a portion thereof formed with a generally arcuate or semicircular cross section and which is secured at the vertical support in a manner not allowing it to pivot. Thus, it is achieved that, on the one hand, the inclination of the headrest is adjusted by a movement in the direction perpendicular to the direction of the forces acting on said headrest and that, therefore, the mounting body of the headrest at all times remains in direct, firm engagement with the horizontal support. Thus, the disadvantages of positive force transmission or releaseable connections of the headrest with the horizontal support are avoided. The positive engagement of the mounting body of the headrest in the slotted recesses of the horizontal support guarantees, on the other hand, a very good absorption of the impact energy resulting from the impact of the head on the head rest by deforming the walls of the slots of the peripheral recesses of the horizontal support. Due to the fact that the impact energy of the head on the headrest is converted to deformation energy the difficulties regarding the adjustment and maintaining the necessary friction torque are avoided. These difficulties occur especially in a positive frictional connection between headrest and horizontal supports.

In a preferred embodiment the mounting body of the headrest is guided through annular sliding members on the horizontal support which preferably is a round pipe section. The horizontal support allows limited movements of the headrest in its longitudinal direction. In the cross-direction the mounting body of the headrest is positively supported in one or several straight peripheral recesses of the horizontal support through at least one projection which projects beyond the periphery of the annular sliding member(s). The peripheral recesses are at an oblique angle and preferably form a very flat angle with the axis of the horizontal support. Especially the fact that the horizontal support is a section of a round pipe with a comparatively thin wall guarantees a large degree of energy absorption through deformation energy since the slots are widened by the projections of the annular sliding members, which projections rest against the edges of the slots. The projections projecting into the inside diameter of the annular sliding members may be formed immediately by the free ends of the arms of the stirrup-shaped mounting body of the headrest by passing the arms through the annular sliding members. The very flat inclination of the peripheral recesses of the horizontal support relative to the axis of the horizontal support guarantees a self-locking effect when the headrest is subjected to a sudden load. Thus, the inclination of the headrest will not change even when the head hits the headrest at an extremely unfavorable angle. In a further modification of the invention a braking disk of friction material is inserted between the peripheral area of the horizontal supports and the sliding rings which are connected to the free ends of the arms of the mounting body. This braking disk prevents an unintentional adjustment of the inclination of the headrest at least during normal use of the vehicle. The braking effect of a braking disk assigned to the sliding rings is generally absolutely sufficient to inhibit lateral movements of the headrest. These lateral movements serve to adjust the inclination of the headrest. The lateral movements of the headrest are inhibited so that a headrest can usually not be adjusted unintentionally. However, it might be advantageous to provide a clamping device instead of a braking disk or in addition to a braking disk. The clamping device might especially be a clamping screw which is passed through the annular sliding member(s). By means of the clamping screws an additional protection against unintentional adjustments of the headrest would be provided.

According to another important feature of the invention it is provided that each of two vertical supports connected to the horizontal supports is connected to the horizontal support through a ring member which embraces the horizontal support and is longitudinally movable at this horizontal support. It is also provided that the vertical support with its top end which is passed through the ring member engages in a peripheral groove whose direction is parallel to the longitudinal axis of the horizontal support. The ring members connected to the vertical supports can be immovably secured in position at the horizontal support by means of clamping devices, preferably by means of clamping screws which have a coaxial direction relative to the vertical supports. Indeed, a headrest for vehicle seats is already known wherein the vertical supports supporting the headrest at the seat back of the vehicle seat are connected through clamp straps to the supporting device structurally related to the headrest body in such a manner that the vertical support can be adjusted corresponding to the receiving parts in the seat backs of the vehicle seat to different spaces between the receiving parts. However, these known support fastening devices are very cumbersome and expensive to produce on the one hand, and, on the other hand, are not in the position to convert impact energies transmitted from the headrest body to the support devices into deformation energy. In comparison, the inventive support fastening device at the horizontal support has the advantage that, on the one hand, a permanent positive connection between vertical supports and horizontal supports exists since the free ends of the vertical supports project into the longitudinal slots of the horizontal support and that, on the other hand, in case of a load resulting from impact energy a substantial part of this energy is converted into deformation energy. This energy conversion is due to the fact that the slots in the peripheral wall of the horizontal support are widened by the ends of the vertical supports which are resting against the longitudinal edges of the slots.

In a further individual embodiment of the invention it is also provided that those slotted recesses of the horizontal support which are related to the ends of the arms of the mounting body and are at an oblique angle relative to the axis of the horizontal support and those slotted recesses of the horizontal support which are related to the vertical supports and are parallel to the axis of the horizontal support are located opposite each other and staggered in the longitudinal direction of the horizontal support.

According to another embodiment of the invention it is provided that the free ends of the arms of the mounting body only engage the sliding rings which guide the mounting body on the horizontal supports. It is also provided that a screw-bolt provided with a cone-shaped tip is passed through the sliding rings, the sliding rings being located opposite the ends of the arms of the mounting body and engaging the helical peripheral recess of the horizontal support. In this embodiment the apex of the cone of the screw-bolt is a hollow member which is axially movable and arranged in an axial recess of the screw-bolt. Through a compression spring a load is applied to the hollow member forcing it to project outwardly. Due to the effects of this compression spring the hollow member engages the helical peripheral recess of the horizontal support. The free ends of the vertical supports which are passed through the ring members and engage the horizontal support are provided with an apex of a cone and comprise a thread by means of which they can be screwed into a taphole of the ring members. Preferably, the free ends of the vertical supports are screwed into the ring members by means of a plug device and a cross bore in such a manner that the apex of the cone rests against the inner circumference of the wall of the pipe-shaped horizontal support. In this embodiment of the invention the helical and the straight peripheral recesses are arranged next to each other and on the same side of the horizontal support, in the areas of both ends of the horizontal support.

In the following description of an example the invention is described in detail on the basis of an embodiment shown in the drawing.

FIG. 2 shows a side view of the headrest according to the invention along lines II—II of FIG. 1;

FIG. 3 shows a side view of the headrest according to the invention along line III—III of FIG. 1;

Figure 4:
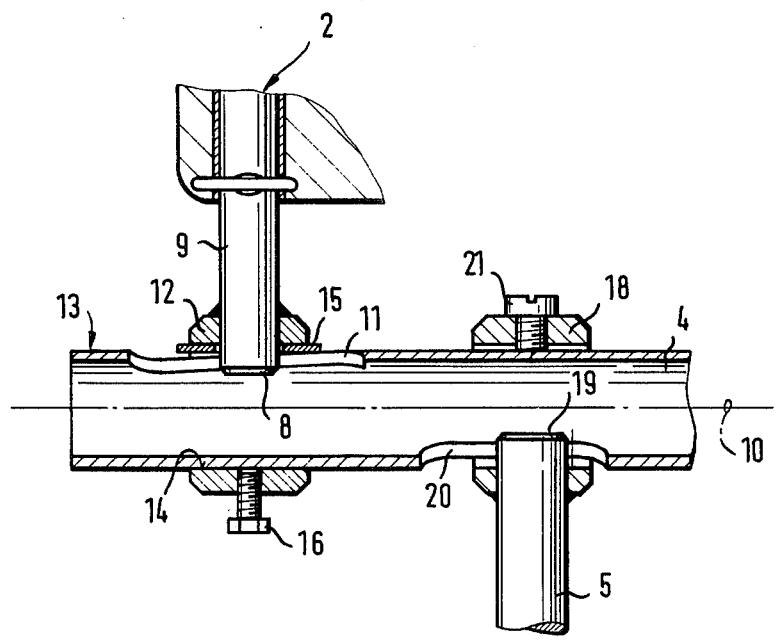
FIG. 4 shows a section through the support of the headrest along line IV—IV of FIG. 1.
Figure 5:
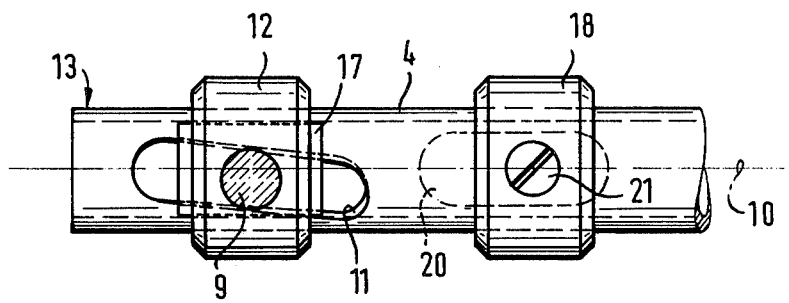
FIG. 5 shows a top view of FIG. 4.

The headrest shown in the drawing comprises a padded body 3 which is foamed onto a stirrup-shaped mounting body 2 and is provided with slot-shaped perforations 1. By means of a horizontal support 4 the headrest is arranged with limited adjustability either on vertical supports 5 or on a clamping stirrup 7 which embraces the seat back 6 of a vehicle seat. The stirrup-shaped mounting body 2 consists, as can be seen especially from the representation of FIG. 4, of a section of round material which is bent to be essentially U-shaped. Through free ends 8 of its arms 9 the mounting body 2 is longitudinally movably guided at horizontal support 4 in slotted recesses 11 which are oblique relative to the longitudinal axis 10 of horizontal support 4. In the areas of the free ends 8 of the arms 9 sliding rings 12 are connected to the arms 9 of the mounting body 2. These sliding rings 12 are designed to take over the support of the weight of the headrest against the horizontal support 4 and, at the same time, they provide a longitudinal guidance for the arm ends 9 of the mounting body 2 when moved along the horizontal support in a longitudinal direction. Therefore, the sliding rings 12 may consist of a material with relatively thin walls. In the illustrated embodiment the horizontal support 4 consists of a section of a pipe material with relatively thin walls. The horizontal support 4 projects beyond the headrest padding on both sides by an insignificant amount. The slotted recesses 11 are, as can be seen especially from the representation of FIGS. 1 and 5, arranged at a very flat angle relative to the longitudinal axis 10 of the horizontal support 4. In the illustrated embodiment the length of the slotted recesses 11 is such that they allow an adjusting range of the headrest of approximately 25°. The headrest is adjusted by moving it along the horizontal support 4. The adjustment of the inclination of the headrest results from the oblique position of the longitudinal slots 11 which form a helix in their imagined extensions. In the illustrated embodiment the longitudinal slots 11 are—in departure from an ideal helix—straight in order to enable a simpler production. To prevent an unintentional movement of the headrest during normal use of the vehicle a convex braking disk 15 is arranged between the peripheral surface 13 of the horizontal support 4 and the inner circumference 14 of the sliding ring 12. The restraining force of the braking disk 15 is exactly sufficient to prevent an unintentional movement and the resulting adjustment of the headrest during normal use of the vehicle. In addition, as can be seen from the representation of FIG. 4, a clamping screw 16 is provided which acts at the peripheral surface 13 of the horizontal support 4. This clamping screw 16 provides an additional protection against an unintentional movement of the headrest in the longitudinal direction of the horizontal support 4. It can be clearly seen from the drawing that it is possible to adjust the inclination of the headrest in a simple manner by longitudinal movement along the horizontal support 4. The mounting body 2 of the headrest body remains continuously in firm engagement with the horizontal support 4 due to abutment of the arms 9 against the sides of the slots 11. Thus, a secure connection between headrest body and horizontal support 4 is established and undesired rotative movement of the headrest relative to the support 4 is prevented merely by locking or preventing relative longitudinal movement therebetween. In addition, the very narrow angle formed between the longitudinal slots 11 and the longitudinal axis 10 of the horizontal support 4 guarantees that locking abutment occurs between the free arm ends 8 and the walls 17 of the longitudinal slot 11 when the headrest body is subjected to a sudden load. Thus, an undesired displacement of the headrest body is prevented when a sudden load is applied.

In vehicles equipped with prepared receiving parts for the vertical supports 5 of the vehicle headrests the vertical supports 5 are used to fasten the headrest at the seat back 6 of the vehicle. These vertical supports 5 are shown in the left portion of FIG. 1 and in FIG. 2 as well as in FIGS. 4 and 5. Since, according to experience, the prepared receiving parts for the vertical supports 5 are located at varying spaces in different types of vehicles the vertical supports 5 are longitudinally movably connected to the horizontal support 4 through ring bodies 18. At the same time, the vertical supports 5 engage with their free ends 19 recesses 20 of horizontal support 4. These recesses are parallel to the longitudinal axis 10 of the horizontal support 4. Therefore, the vertical supports 5 are at all times firmly engaged in horizontal support 4. The vertical supports 5 can be secured in the position corresponding to the respective receiving parts at the seat back 6 of the vehicle by means of clamping screws 21 which are passed through the ring members 18. Especially from the representation of FIG. 4 it can also be seen that the peripheral recesses 11 and 20 are located opposite each other and staggered in the longitudinal direction of the horizontal support 4. The peripheral recesses 11 which are operatively related to the mounting body 2 of the headrest are located at the outside and opposite the peripheral recesses 20 which are operatively related to the vertical supports 5.

Figure 6:
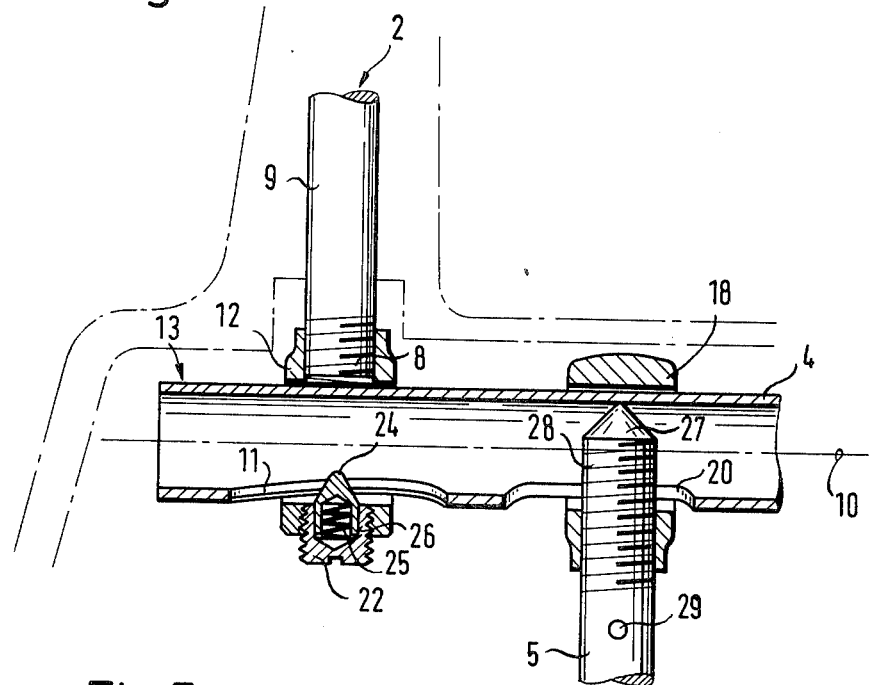
FIG. 6 shows a section through another embodiment of the support of the headrest according to FIG. 4.
Figure 7:
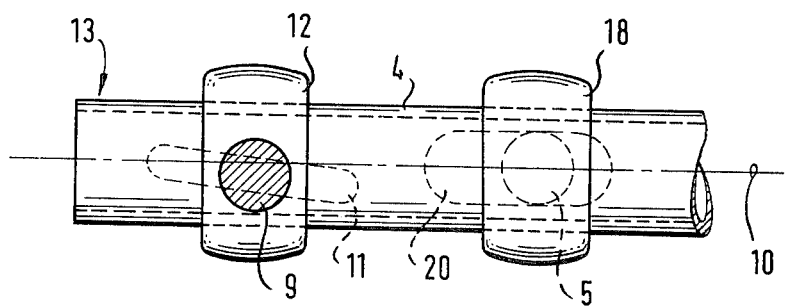
FIG. 7 shows a top view of FIG. 6.

FIGS. 6 and 7 show an embodiment of the invention which can be assembled in an especially convenient manner. In this embodiment the free ends 8 of the arms 9 of the mounting body 2 engage the sliding rings guiding the mounting body on the horizontal support 4 and are connected in the known manner with these sliding rings 12. Opposite the receiving parts for the ends 8 of the arms of the mounting body 2 a screw-bolt 22 is passed through the sliding rings 12. This screw-bolt 22 is provided with a cone-shaped tip 24 and engages the helical peripheral recess 11 of the horizontal support 4. The apex of the cone 23 of the screw-bolt 24 is formed by a hollow member which is axially movably arranged in an axial recess 26 of the screw-bolt 24 and to which a load is applied through a compression spring 25 forcing the hollow member to project outwardly so that the apex of the cone 23 is pressed into the helical peripheral recess 11 of the horizontal support 4. The free ends of the vertical supports 5 passed through the ring members 18 are provided with an apex of a cone 27 and are screwed into a corresponding taphole of the ring members 18 through a thread 28 in such a manner that in assembled vertical supports 5 the apex of the cone 27 rests against the inner wall of the pipe-shaped horizontal support 4.

In order to facilitate screwing of the vertical supports 5 into the ring members 18 the vertical supports 5 are additionally provided with a cross-bore 29 into which a suitable plug device may be inserted or which substantially facilitates screwing the vertical supports 5 into the ring members 18. This embodiment of the invention allows an arrangement of the helical peripheral recess 11 as well as the straight peripheral recess 20 at the same side and next to each other in the areas of both ends of the pipe-shaped horizontal support 4.

Figure 1:
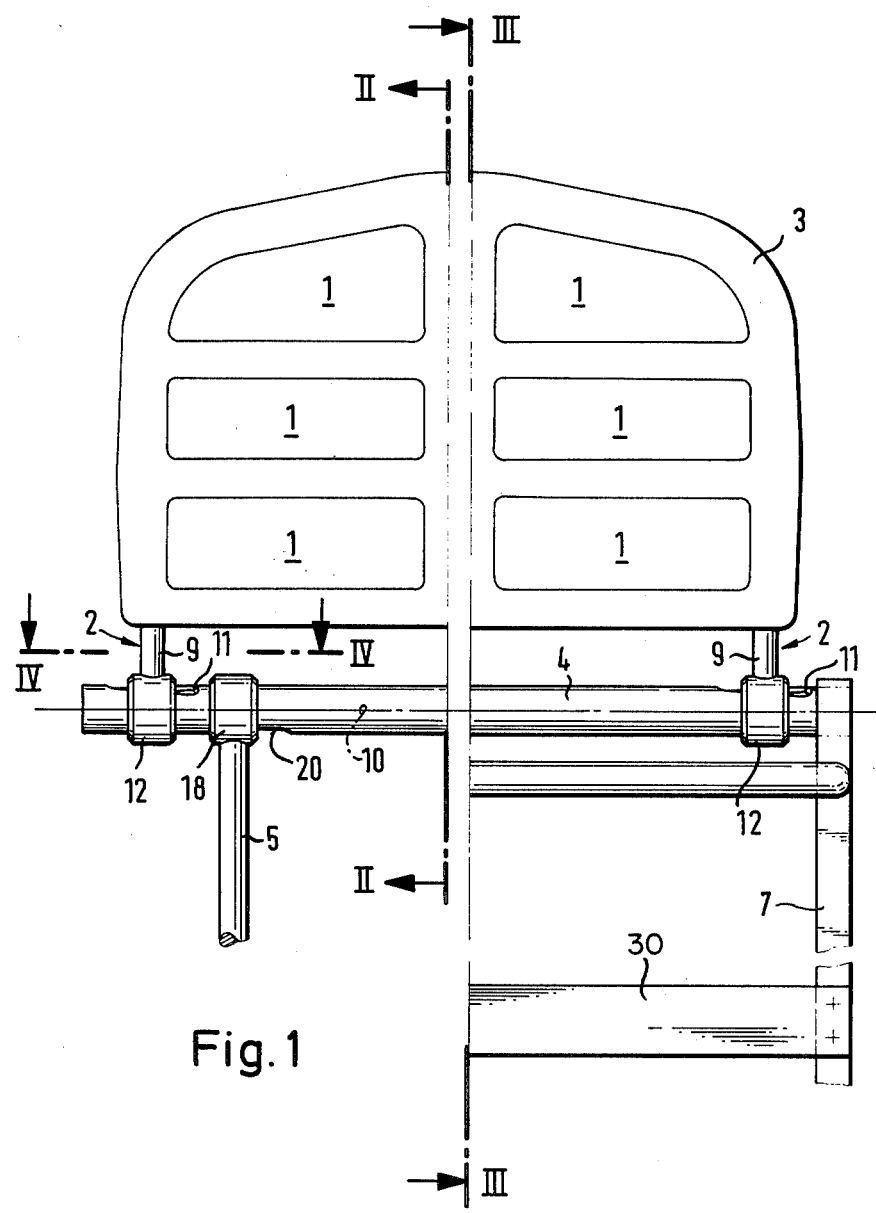
FIG. 1 shows a front view of a headrest according to the invention.

The right half of FIG. 1 and FIG. 3 show a modified embodiment of the inventive headrest wherein the vertical supports 5 of the above-described head rest are replaced by clamping stirrups 7 embracing the seat back 6 of the vehicle. Arrangement and design of these clamping stirrups 7 as well as of the tension belts 30 in supported engagement with the clamping stirrups 7 are generally known. When the clamping stirrup 7 is used the horizontal support 4 is attached to the inner circumference of the stirrup bend 23.

I claim:

1. A mounting assembly for the headrest of an automotive vehicle including at least one seat with a seat back comprising: a padded body; arm means in fixed engagement with said padded body; a horizontal support member having a generally horizontally extending longitudinal axis; attachment means mounting said horizontal support member on said seat back to prevent pivotal movement thereof about said longitudinal axis; and connecting means mounting said padded body upon said horizontal support member to enable adjustable pivotal movement thereof about said longitudinal axis to a plurality of inclined positions; said connecting means including slot means defined in said horizontal support member and receiving said arm means therein for guided engagement therewith; said slot means comprising at least one longitudinal slot oriented to extend obliquely relative to said longitudinal axis, said at least one obliquely oriented slot engaging said arm means to guide said padded body for movement pivotally about said longitudinal axis when said padded body is moved longitudinally relative thereto thereby to enable said padded body to be adjustably pivotally moved to said plurality of said inclined positions.

2. An assembly according to claim 1 wherein said horizontal support member is a hollow tubular body having a generally circular cross-sectional configuration and wherein said at least one obliquely oriented slot extends relative to said longitudinal axis in a generally helical direction.

3. An assembly according to claim 2 further comprising at least one annular sliding member having said arm means fixedly mounted thereto and mounted on said horizontal support member for sliding axial and rotative movement relative thereto.

4. An assembly according to claim 3 wherein said arm means extends through said at least one annular sliding member and into the hollow interior of said horizontal support member to a distance at least equal to the wall thickness of said hollow tubular body.

5. An assembly according to claim 3 further comprising at least one braking disc interposed between said horizontal support member and said annular sliding member to provide a frictional force braking relative movement therebetween.

6. An assembly according to claim 1 further comprising clamping means for releasably fixedly securing said padded body in locked engagement with said horizontal support member.

7. An assembly according to claim 3 further comprising clamping means including clamping screws extending through said annular sliding member into releasable engagement with said horizontal support member to releasably lock said padded body relative thereto.

8. An assembly according to claim 1 wherein said attachment means include at least one longitudinal attachment slot formed in said horizontal support member and extending generally parallel to said longitudinal axis, and at least one attachment arm affixed to said seat back, said attachment arm extending into operative engagement within said attachment slot to enable axial movement of said horizontal support member relative to said seat back.

9. An assembly according to claim 8 further comprising an attachment annular sliding member having said attachment arm fixedly connected thereto and extending in sliding engagement around said horizontal support member and attachment locking means for releasably locking said attachment annular sliding member relative to said horizontal support member.

10. An assembly according to claim 9 wherein said at least one attachment slot and said at least one obliquely extending slot are located adjacent opposite ends of said horizontal support member circumferentially staggered relative to each other.

11. An assembly according to claim 1 wherein said attachment means comprise U-shaped clamping stirrups and tension belts in engagement with said clamping stirrups to hold said horizontal support member on said seat back.

12. An assembly according to claim 3 wherein said padded body is fixedly connected with said at least one annular sliding member on one side thereof, and wherein said arm means extends in threaded engagement from said sliding member through said obliquely oriented slot on a side of said sliding member other than said side on which said padded body is attached.

13. An assembly according to claim 12 wherein said arm means is provided with a cone-shaped tip extending in engagement through said obliquely oriented slot.

14. An assembly according to claim 13 further comprising spring means for applying a spring force urging said cone-shaped tip inwardly of said horizontal support member and to within said obliquely oriented slot.

15. An assembly according to claim 9 wherein said attachment arm includes an innermost end extending into said horizontal support member and formed as a conical apex, and wherein said attachment locking means comprise screw thread means for effecting threaded engagement between said attachment arm and said attachment annular sliding member, said screw thread means enabling said conical apex of said attachment arm to be forced into abutting engagement against horizontal support member.

16. An assembly according to claim 8 wherein said attachment slot and said obliquely oriented slot are arranged alongside each other in general axial alignment on said horizontal support member.

* * * * *